UNITED STATES PATENT OFFICE.

FREDERICK MOENCH, OF RUSHVILLE, ILLINOIS.

SOLDERING-IRON.

1,172,161.            Specification of Letters Patent.      Patented Feb. 15, 1916.

Application filed October 2, 1915. Serial No. 53,769.

*To all whom it may concern:*

Be it known that I, FREDERICK MOENCH, a citizen of the United States, and a resident of Rushville, in the county of Schuyler and State of Illinois, have invented a certain new and useful Improvement in Soldering-Irons, of which the following is a specification.

My invention relates to improvements in soldering irons, and it consists in the combinations, constructions, and arrangements herein described and claimed.

An object of my invention is to provide a soldering iron by means of which soldering operations that have hitherto been considered difficult may be readily accomplished.

A further object of my invention is to provide a soldering iron which is particularly adapted for soldering aluminum, and by the use of which aluminum soldering may be rendered easy.

A further object of my invention is to provide a soldering iron which when "tinned" will retain a sufficient amount of solder to enable one to do considerable work without the necessity of picking up additional solder, during the soldering operation.

Other objects and advantages will appear in the following specification, and the novel features of the invention will be particularly pointed out in the appended claim:

My invention is illustrated in the accompanying drawings forming part of this application, and in which—

Figure 1 is a perspective view of the device. Fig. 2 is a cross section along the line 2—2 of Fig. 1. Fig. 3 is a view looking toward the pointed end of the soldering iron. Fig. 4 is a perspective view of a portion of a modified form of the device. Fig. 5 is a section along the line 5—5 of Fig. 4.

In carrying out my invention I provide a handle 1 which may be of wood, a shank 2 which may be a metal rod inserted at one end into the handle 1, or a twisted wire shank as shown in Fig. 1.

The body portion 3 of the soldering iron may be shaped to suit the work required. It may be made of any metal. I find that aluminum works splendidly for almost all purposes, as it is light, tins easily, and works fast. The body portion 3 is provided with longitudinal slots, these slots in the present instance, being at right angles to each other and intersecting. As will be seen from the drawings, the slots extend inwardly from the pointed end of the body portion 3. These slots are shown at 4 in the drawing.

The soldering iron is provided with beveled faces 5, leaving corners 6 by means of which one may have easy access to joints.

From the foregoing description of the various parts of the device, the operation thereof may be readily understood.

The article to be soldered is cleansed by means of a caustic potash solution to remove grease. Hydrochloric or hydrofluoric acid is then used to remove the metallic oxid, after which the acid is neutralized with an alkaline solution. The metal surface is subsequently washed free of all trace of alkali. Hydrogen peroxid is now used to wash off the metal, thus leaving the latter in a perfect aseptic condition. Asepsis applies to working metals, as well as to physical operations, and I wish to emphasize the point that it is a law to be strictly observed that in working with metals, in order to be successful, the organic matter must be removed. The common lead or tin mixture, which is the ordinary solder, may be used. The soldering iron is tinned in the ordinary manner, preferably by first filing the exposed surfaces or rubbing them bright. This includes the brightening of the exposed surfaces in the slots, which may be done by emery paper or other suitable attrition material. As soon as the solder adheres to the iron, the work may be begun and continued in the ordinary manner. The presence of the slots tends to hold a larger quantity of solder, without increasing the size of the soldering iron, so that in soldering a joint, for instance, a greater length may be soldered without the necessity of picking up more solder.

To clean the iron if it becomes foul, all that is necessary is to brush or file off the accumulations during the process of soldering, and rub the hot instrument over a bar of lead solder. The soldering metal should be worked at as low a temperature as possible. A good rule to follow is don't work the solder too hot.

By the use of this improved soldering iron, aluminum and other metals may be soldered without the use of any flux whatever, provided they are first cleansed of oxids and organic matter in the manner already described.

F. MOENCH.
SOLDERING IRON.
APPLICATION FILED OCT. 2, 1915.
1,172,161.  Patented Feb. 15, 1916.
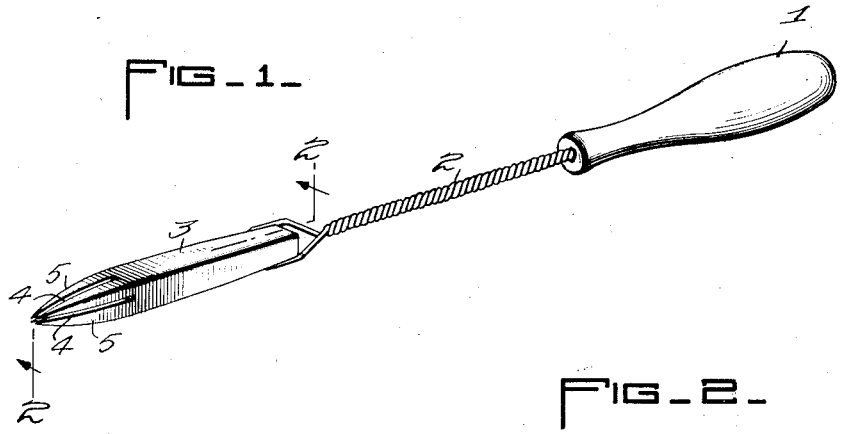
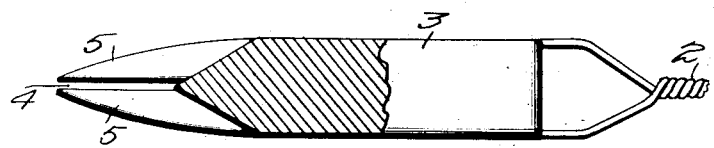
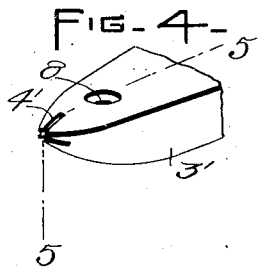
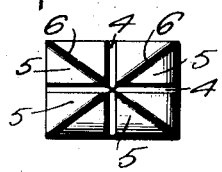
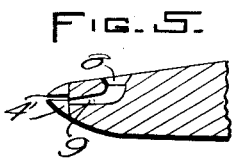
WITNESSES:
INVENTOR
Frederick Moench,
BY Munn & Co.
ATTORNEYS